United States Patent [19]

Chapman

[11] Patent Number: 4,791,704
[45] Date of Patent: Dec. 20, 1988

[54] AUTOMATIC TRANSFER APPARATUS

[75] Inventor: Gregory A. Chapman, Epping, Australia

[73] Assignee: Lindholst & Co. (Australia) Pty. Limited, New South Wales, Australia

[21] Appl. No.: 16,092

[22] Filed: Feb. 18, 1987

[30] Foreign Application Priority Data

Feb. 18, 1986 [AU] Australia .................. PH4661

[51] Int. Cl.$^4$ .................................... A22C 21/00
[52] U.S. Cl. ........................... 17/11; 17/24; 198/441; 198/459; 198/612; 198/803.14
[58] Field of Search ............. 17/24, 11, 44.1; 198/612, 803.14, 459, 441

[56] References Cited

U.S. PATENT DOCUMENTS

| | | | |
|---|---|---|---|
| 4,178,659 | 12/1979 | Simonds | 17/24 |
| 4,574,428 | 3/1986 | Meyn | 17/44.1 X |
| 4,597,133 | 7/1986 | van de Nieuwelaar | . |
| 4,660,256 | 4/1987 | Innes et al. | . |
| 4,675,943 | 6/1987 | Tabata | 17/24 X |

Primary Examiner—Willie G. Abercrombie
Attorney, Agent, or Firm—Birch, Stewart, Kolasch, & Birch

[57] ABSTRACT

An arrangement for transferring poultry carcasses such as the carcasses of birds being chickens, ducks, turkeys and the like, from one position to another may be used to transfer the poultry carcasses from a killing conveyor to an eviscerating conveyor, for example. The arrangement can, however, be used to transfer poultry carcasses from any one conveyor to another conveyor. The arrangement includes a rotatably mounted plate and associated structure for imparting a rotational moment thereto. A plurality of sector members are pivotally mounted on or connected to the plate at a position offset or spaced apart from the rotational mounting of the plate. The rotational moment of the plate can be imparted to the sector members. Members are provided to limit or control the pivotal movement of the sector members relative to each other and to the pivotal attachment point. On rotation of the plate, the rotational moment is imparted to the sectors which rotate and move and pivot relative to each other so that as the sector members move from one position to another, the spacing therebetween is variable by a distance corresponding substantially to the distance between the rotational mounting of the plate and the pivotal mounting of the sector members. Preferably, the sector members are provided in their base ends to accommodate portions of poultry carcasses.

7 Claims, 2 Drawing Sheets

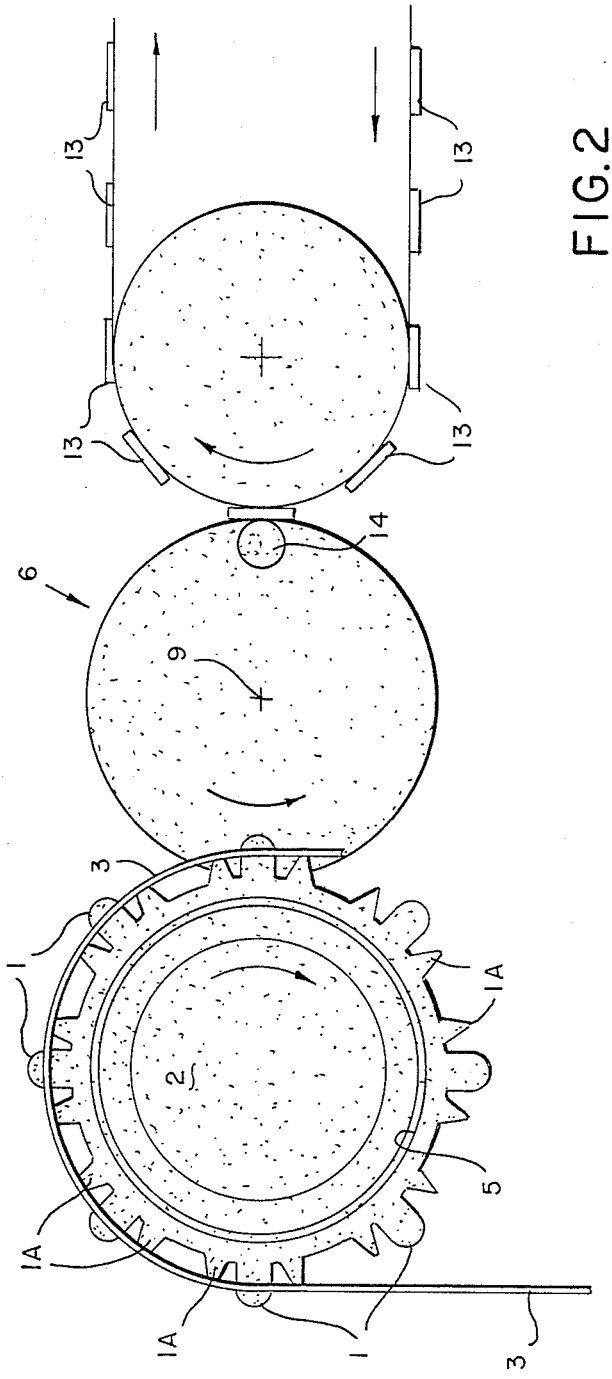
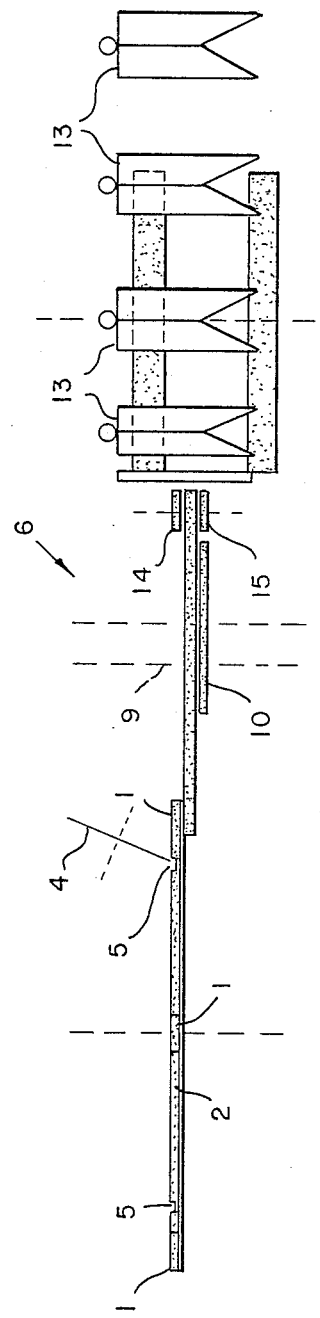

AUTOMATIC TRANSFER APPARATUS

FIELD OF THE INVENTION

This invention relates to apparatus for use in processing poultry, and in particular to an apparatus for use in poultry processing plants. The invention relates to an apparatus for transferring slaughtered birds or carcasses from a first conveyor to another spaced apart conveyor or from one position to another position.

DESCRIPTION OF THE BACKGROUND ART

In the processing of birds or poultry, such as for example chickens, ducks, turkeys and the like, it has long been known to suspend birds in a head downward position, by slotting their feet into shackles of an overhead conveyor such as an overhead chain conveyor. Such a conveyor moves the birds through a number of stations, such as for example, a stunning station, a killing station, a bleeding station, a scalding station, a defeathering station, and finally, a dehocking station where the legs of the slaughtered birds are severed at the knee joint (for example, by means of a rotating hock cutter). Such a hock cutting operation results in the birds (now without lower legs) falling onto a table, chute or conveyor belt for eventual rehanging on a further spaced apart conveyor, such as for subsequent eviscerating.

There have been a number of disadvantages with such processes, including the cross-contamination of carcasses as they lay heaped on a table awaiting rehanging and the chance of repetitive strain injury to operators who have to lift the birds and force them into shackles in an eviscerating conveyor. This latter disadvantage is particularly apparent with some large birds, such as large turkeys, which may weigh 20 kg or more. In addition, the cost for such processes have been high as they are labor intensive. These processes have also often been inefficient.

Health and hygiene laws in many countries now require separate conveyor systems to be used for slaughtering and eviscerating.

It is known to provide arrangements which transfer birds or carcasses from one conveyor to another, but such arrangements only allow for the passing of a bird or carcass from one conveyor to another at substantially equal spacings. That is, equal spacings from one bird to another.

It has been found that such arrangements are not always appropriate and in particular, they are not always appropriate for the requirements of the operators. For example, it may be the case that shackles attached to a conveyor can be spaced one from another (and thus, the attached birds spaced from one another) by varying spacings, such as for example, 4 inches, 6 inches, 8 inches, 12 inches, or the like. The optimum spacing is determined not only by the size of the bird, but also by purpose. For example, in the case of chickens, an 8 inch spacing between carcasses may be advantageous and appropriate when the bird is being killed and defeathered, while a spacing of only 6 inches may be required and appropriate when the bird is going through an eviscerating process. In the case of a larger bird, such as a turkey, an initial spacing appropriate for killing and defeathering may be from approximately 10 inches to 12 inches. An appropriate spacing for the eviscerating of the turkey, however, may only be approximately 8 inches.

Thus, while known arrangments allow for the transfer of birds, or carcasses from one conveyor to another at substantially the same or regular spacings, there is clearly a need to provide an arrangement which allows for the birds or carcasses to be transferred from one conveyor (where they are at one particular spacing) to a spaced apart conveyor (where they are at spacings different from the first conveyor). It may also be desired to transfer birds from, for example, an eviscerating conveyor to a conveyor leading to a chilling chamber, in a manner such that the spacings will differ from one conveyor to another. Also, the spacings required may vary depending upon the nature and size of the bird concerned.

SUMMARY OF THE INVENTION

The above and other disadvantages are overcome, according to the present invention, by a transfer apparatus for transferring poultry or carcasses between spaced apart conveyor having different shackle spacings.

Yet, another object of the present invention is transferring of poultry or carcasses from an eviscerating conveyor to a chilling or air-cooling conveyor.

A further object of the present invention is to provide a transfer apparatus that meets industry and operator requirements.

These and other objects of the present invention are fulfilled by providing a rotatably mounted plate with means to impart rotational moment thereto, said plate being positioned between and spaced apart from two conveyors. A plurality of sector members are pivotally mounted to said plate at a point spaced apart and offset from the rotational mounting of said plate and means are provided to impart a rotational moment from said plate to said sector members and to limit or control pivotal movement of said sector members relative to each other and to their pivotal attachment to said plate. The sector members are mounted so that on rotation of said plate they are caused to rotate with said plate and to pivot relative to each other from a first position and first spacing relative to each other to a second spaced apart position and second spacing relative to each other. The spacings at said spaced apart positions differing by a distance corresponding substantially to the distance between the rotational mounting of said plate and the pivotal mounting point of said sector members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a schematic top plan view of an apparatus according to the present invention;

FIG. 2 is a corresponding side evaluation;

DETAILED DESCRIPTION OF THE PREFERRED EMBODIMENTS

Figure 5:
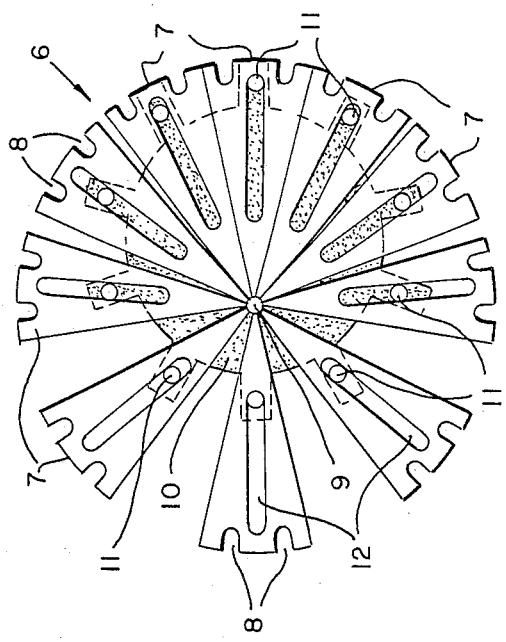
FIGS. 3, 4, and 5 show, in greater detail, aspects of the transfer arrangement of the present invention.

As referred to hereinbelow, the invention has application to transferring birds or carcasses from one conveyor to another, the invention having application to any appropriate bird or carcass. For the purposes of description and definition, however, such birds and carcasses will be referred to by way of example, as poultry carcasses.

Referring firstly to FIG. 1 of the accompanying drawings, poultry carcasses which have already been slaughtered and defeathered are conveyed by an overhead conveyor chain to the transfer apparatus of the present invention. The poultry carcasses which are hung by their legs, are hung in shackles, a rotary hock cutter 2 being provided which will cut and remove the hocks of the carcasses.

Ancillary lugs 1A between lugs 1 prevent displacement of the legs of the carcasses. Guide members 3, such as a tubular guide, will allow the carcasses and legs to be guided into a hock cutting position while the guide members 3, preferably provided above and below the hock cutter 2, will bend and angle the legs of the carcasses at the joint between the lower leg and the drumstick, so as to present the joint accurately to, for example, a blade 4 which severs the leg at the joint. This blade can be driven by any appropriate prime mover, such as an electric motor. Preferably, the blade 4 coacts with a substantially annular cutting groove 5 provided in the hock cutter 2.

When the legs have been severed, the poultry carcass is freed from the shackles of the killing conveyor and falls away from the conveyor and from the guide members 3.

The knuckles of the poultry carcass are, however, engaged with notches provided in the periphery of a transfer arrangement 6 of the present invention which is adjacent to but spaced apart from the first killing conveyor. The poultry carcasses then fall away from and are disengaged following the action of the hock cutter 2. The carcasses will disengage form the guide members 3 in such a way that remaining knuckles of the poultry carcass will engage with peripheral notches or recesses provided in the transfer arrangement 6.

The guide members 3 are so formed and positioned about the operational perimeter of the hock cutter 2 and are of such a length that the poultry carcass is retained and held in position until a transfer point is reached where it can be transferred a straight-forward manner to the transfer arrangement 6 of the present invention. The knuckles will then engage the aforesaid peripheral recesses which will be further described hereinafter.

Referring now to the transfer arrangement 6, this arrangement preferably includes a rotatably mounted plate 10, preferably of a substantially circular configuration. In the preferred form of the invention, the plate 10 is adapted to rotate about a substantially vertical axis, such as about a substantially central pivot point 10A. Appropriate prime mover or motor means and, if necessary, associated gearing is provided to impart a rotational moment to the plate 10.

Figure 3:
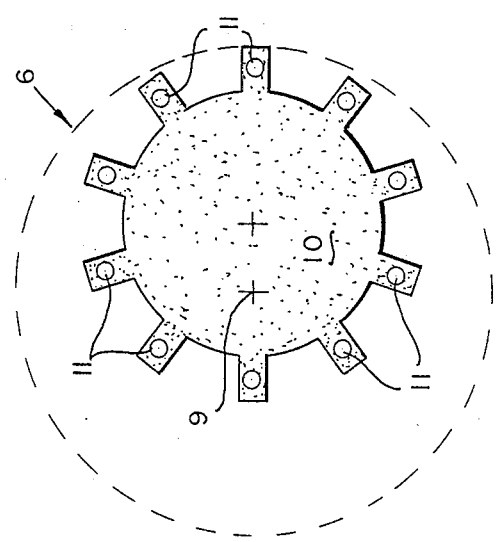

The plate 10, as shown in the accompanying drawings, is preferably provided with a plurality of substantially equidistantly spaced-apart pins 11, each one being slidable in a longitudinal slot 12 of a sector member 7 to be described below. The pins 11 are preferably circumferentially spaced apart about the periphery of the plate 10. The pins 11 extend upwardly from the upper surface of the plate 10 and, as shown in FIGS. 3 and 5, are in one form of the invention located on radially extending lugs 10B which extend outwardly from the circumferential periphery of the plate 10.

The present invention also includes a plurality of sector members 7, each of which is provided with a pair of notches 8, which conform to the spacing between suspension points on the shackles as seen in FIG. 5. Each sector member 7 is of a generally elongated triangular configuration and which are pivotally mounted at their apices to a pivot point 9 on the table 10.

The sector members 7 are provided with elongated slots or grooves 11A therein, and the sectors 7 are pivotally mounted or attached to the plate 10 so that each groove 11A fits over or engages an upstanding pin 11.

The sector members 7 are attached or pivotally mounted to the plate 10 at a position spaced apart and offset from the substantially central rotational mounting of the plate 10. Base end portions 7A of the sector members 7 are preferably provided with or profiled to incorporate one or more of the recesses or notches 8 to house and accommodate knuckles and leg portions of poultry carcasses as they come away from, or are released from the hock cutter 2.

In operation, therefore, and on a rotational moment being applied to the plate 10, this plate 10 rotates, and the location of the pins 11 within the grooves or slots 11A of the sector members 7 will cause a rotational moment to be imparted from the table 10 to the sector members 7. The sector members 7 will, therefore, rotate with the plate 10 and will also pivot relative to each other about the pivot point 9.

As will be appreciated particularly from FIG. 5 of the accompanying drawings, the spacing between the sector members will vary and alter as the table 10 and thus, the sector members 7 rotate.

Figure 4:
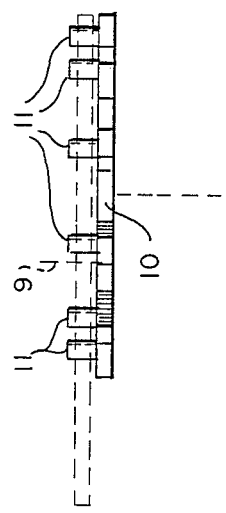

It should be appreciated that the distance by which the spacing between the sector members 7 can vary from one position to a spaced apart position substantially corresponds to the distance between the rotational mounting point 10A of the plate and the pivotal mounting point 9 of sectors 7. Variation of this distance can also vary the distance by which the sector members can be spaced one from the other. The mounting hereinbefore referred to, also allows for spacing to vary from one position to a further spaced apart position, wherein, in a first circumferential position, the sector members 7 are spaced apart, for example, at 8 inch centers to a second spaced apart circumferential position, for example, where the sector members 7 are spaced apart by 6 inches. Such an arrangement allows for poultry carcasses to be taken from a killing conveyor at approximately 8 inch centers (at one circumferential position of the transfer arrangement) and, on rotation of the plate 10 and sectors 7, to be delivered to a spaced apart eviscerating conveyor located at a further spaced apart circumferential position, at approximately 6 inch centers. It should be recognized that these differing centers are by way of example only. This will be apparent from the accompanying drawings and in particular, FIG. 4 of the accompanying drawings.

It will be appreciated from the above that the transfer arrangement 6 forms a table which has the ability to transfer poultry carcasses from one position wherein the carcasses are at a certain spacing one from the other to a further spaced apart position in which the carcasses are at a different spacing one from the other. The present invention allows this to take place in a straightforward and efficient manner.

Referring further to the accompanying drawings, and with particular reference to FIGS. 1, 2, 3, and 4 thereof, an arrangement is shown whereby the transfer arrangement 6 serves to transfer poultry carcasses from a first conveyor and hock cutter, to a second conveyor including a plurality of spaced apart shackles 13 for conveying the carcass for eviscerating.

As the sector members 7 of the transfer arrangement rotate, they engage with carcasses from the first killing conveyor and hock cutter 2, rotating the poultry carcasses at first spacings to the eviscerating conveyor 20 which includes a plurality of shackles 13, spaced apart at differing predetermined spacing or centers. At the position at which it is desired to transfer the poultry carcasses from the transfer arrangement 6 to an eviscerating conveyor 20, means are provided which may bear on a knuckle of a leg of the carcass, at the point where it protrudes to gently ease it out of a notch or recess 8 of a sector member 7 and onto a eviscerating shackle 13. In one form of the present invention as particularly shown in FIG. 1 and 2 of the accompanying drawings, a pressure wheel 14 is rotatably mounted and bears upon the knuckle to gently ease it out of its notch and into a suspension point on an eviscerating shackle 13 aligned with the notch. The pressure wheel 14 is rotatably mounted above and spaced apart from the sector members 7. If desired, a further or second pressure wheel 15 can be located beneath the sector members 7 and transfer arrangement 6, so as to exert additional pressure on the drumstick of the poultry carcass to assist in firmly engaging the carcass with the eviscerating shackle 13.

It will be appreciated from the above and the accompanying drawings that the poultry carcasses, once transferred onto the eviscerating conveyor, may be conveyed for eviscerating and further processing, packaging, and the like.

It should also be appreciated that the invention has been described by way of example only, with reference to the transfer of poultry carcasses from the killing and defeathering conveyor to an eviscerating conveyor. It should be appreciated that the invention can be used for transferring poultry carcasses from one conveyor to another, no matter what the purpose of the conveyor. It will be particularly appreciated from the foregoing that the invention provides a transfer arrangement which allows for poultry carcasses to be transferred from one position at certain centers or spacings, to a spaced apart position where they can be loaded onto or attached to a further conveyor at different centers of spacings.

If desired, the invention can be used to transfer poultry carcasses from one line to a plurality of different other lines or conveyors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A transfer arrangement for transferring poultry carcasses from one conveyor to another spaced apart conveyor comprising:
   a rotatably mounted plate;
   means for rotating said plate whereby said plate will rotate about a rotational mounting;
   a plurality of sector members, each being pivotally mounted to said plate at a position spaced apart and offset from said rotational mounting of said plate;
   means for imparting rotational movement from said plate to said sector members; and
   means for at least one of limiting and controlling pivotal movement of said sector members relative to one another and to their pivotal mounting to said plate;
   said sector members each being mounted to said plate for pivotal movement relative to one another and to the plate upon rotation of said plate, each of said sector members successively moving from a first position and spacing relative to adjacent sector members to a second position, said sector members in said second position being spaced further apart from adjacent sector members than said sector members in said first position, the spacing of adjacent sector members in said second position differing from the spacing of adjacent sector members in said first position by a distance equal to a distance between said rotational mounting of said plate and the pivotal mounting of said sector members.

2. The transfer arrangement as recited in claim 1, further comprising a plurality of substantially equidistantly spaced apart, upstanding pins, said pins being provided about a periphery of said plate, each of said sector members being provided with an elongated slot therein, said slot of each of said sector members interacts with one of said pins whereby each of said pins is associated with a slot of each of said sector members, said pins moving in said slots upon rotation of said plate to thereby impart at least a rotational movement to said sector members and to allow each of said sector members to pivot about the pivotal mountings thereof.

3. The transfer arrangement as recited in claim 2, wherein each of said sector members is of a substantially elongated triangular configuration having apices thereof pivotally connected to said plate to form said pivotal mountings, said pivotal mountings of said sector members being offset from said rotational mounting of said plate, said triangular configuration of each of said sector members further forming a base end, each of said base ends being provided with notches therein to accomodate portions of said poultry carcasses.

4. The transfer arrangement as recited in claim 1, wherein the plate is substantially circular and is provided with a plurality of substantially equidistantly spaced apart radially extending lugs spaced circumferentially therearound, each of said lugs mounting an upstanding pin, and wherein each of said sector members is of a substantially elongated triangular configuration having apices thereof pivotally connected to said plate to form said pivotal mounting, each of said sector members having an elongated slot therein which engages one of said upstanding pins whereby upon rotation of the plate, the sector members are caused to rotate with said plate and to pivot relative to said plate and to each other.

5. The transfer arrangement as recited in claim 1, further comprising a plurality of spaced apart upstanding pins provided on radially extending lugs spaced about the circumference of said plate, said sector members further having elongated slots therein for engaging said pins.

6. The transfer arrangement as recited in claim 1, wherein said transfer arrangement transfers poultry carcasses from a killing and defeathering conveyor to at least one eviscerating conveyor.

7. The transfer arrangement as recited in claim 6, further comprising pressure means for acting on portions of said poultry carcasses to assist locating said carcass in at least one shackle provided on said at least one eviscerating conveyor, said pressure means being provided adjacent a position where the poultry carcasses are transferred from said sector members to said shackles on said at least one eviscerating conveyor.

* * * * *